(12) United States Patent
Zamora-McKelvy et al.

(10) Patent No.: US 6,519,616 B1
(45) Date of Patent: Feb. 11, 2003

(54) WEB SITE QUALITY ASSURANCE SYSTEM AND METHOD

(75) Inventors: Michele Zamora-McKelvy, Parker, CO (US); Bryan Stroble, Aurora, CO (US); C. Marlon D. Buggs, Denver, CO (US); Daniel Grisinger, Greenwood Village, CO (US)

(73) Assignee: Qwest Communications International, Inc., Denver, CO (US)

(*) Notice: Subject to any disclaimer, the term of this patent is extended or adjusted under 35 U.S.C. 154(b) by 0 days.

(21) Appl. No.: 09/476,599

(22) Filed: Dec. 31, 1999

(Under 37 CFR 1.47)

(51) Int. Cl.[7] .................................. G06F 11/32
(52) U.S. Cl. .................... 707/501.1; 709/224; 709/217; 707/10; 707/1
(58) Field of Search ................ 709/224, 223, 709/217; 707/501.1, 500, 10, 100, 1

(56) References Cited

U.S. PATENT DOCUMENTS

| | | | |
|---|---|---|---|
| 5,855,020 A | * 12/1998 | Kirsch | 707/10 |
| 5,995,099 A | * 11/1999 | Horstmann | 707/501.1 |
| 6,035,330 A | * 3/2000 | Astiz et al. | 709/218 |
| 6,049,812 A | * 4/2000 | Bertram et al. | 707/516 |
| 6,151,643 A | * 11/2000 | Cheng et al. | 710/36 |
| 6,269,370 B1 | * 7/2001 | Kirsch | 707/10 |
| 6,457,076 B1 | * 9/2002 | Cheng et al. | 710/36 |
| 2002/0129164 A1 | * 9/2002 | Van Der Meulen et al. | 709/239 |

FOREIGN PATENT DOCUMENTS

WO  WO 01/52078 A1 * 7/2001

OTHER PUBLICATIONS

H. Leung; A Tool for Testing Hypermedia Systems; Proceedings of the 25th Euromicro Conf.; vol. 2; pp. 202–209; Sep. 1999.*

* cited by examiner

*Primary Examiner*—Kenneth R. Coulter
(74) *Attorney, Agent, or Firm*—Marsh Fischmann & Breyfogle LLP

(57) ABSTRACT

A system and method for use in assuring the quality of a web site are disclosed. The system and method are particularly directed to the quality assurance of a telephone directory web site that, in response to queries submitted by visitors to the web site, returns telephone listings including links to web pages relating to listed businesses or individuals. The system and method of the present invention allow a user thereof to easily access and view data records generated during periodic tests of the web site. Each record corresponds with a listing in the directory and includes at least one data field having data indicative of the outcome of a search verification test (e.g. a string code such as "OK") and at least one data field having data indicative of the outcome of a link verification test (e.g. an HTTP result code such as "404"). A first interface, displayed by a client, provides for submission of search criteria (e.g. a particular HTTP result code) to a server in communication with the client. A list of records found by the server meeting the submitted search criteria is displayed in a second interface by the client. In displaying the list of records, at least the data indicative of the outcome of the link verification test is displayed for each listed record. In this manner, the system and method of the present invention facilitate identification of listings having links that are failing.

19 Claims, 8 Drawing Sheets

| COMPANY NAME | TELEPHONE | HEADING | HTTP ADDRESS | LISTING ID |
|---|---|---|---|---|
| COMPANY A | 3038617000 | ATTORNEYS | HTTP://WWW.USWESTDEX.COM/FEATURES/163/100009163.HTML | 55000517 |
| COMPANY B | 3037921421 | RENTAL SERVICE | HTTP://WWW.USWESTDEX.COM/FEATURES/621/100006621.HTML | 95000081 |
| COMPANY C | 3037926000 | TELEVISION REPAIR | HTTP://WWW.COMPANYC.COM/ | 75000239 |
| COMPANY D | 3038669999 | COMPUTERS | HTTP://WWW.COMPANYD.COM | 75000241 |
| COMPANY E | 3038664241 | PET SUPPLIES | HTTP://WWW.USWESTDEX.COM/FEATURES/963/100001414.HTML | 131626 |

FIG.3

WEB SITE QUALITY ASSURANCE SYSTEM AND METHOD

FIELD OF THE INVENTION

The present invention generally relates to web site maintenance, and, more particularly, is directed to a system and method for use in assuring the quality of a web site.

BACKGROUND OF THE INVENTION

Hyper-links (hereafter "links") permit persons viewing a web page in a web browser window on a client user computer to expeditiously navigate to another web page maintained on the same or a different server by using a pointing device, such as a mouse, to select a link to the other web page embedded in the web page being viewed. The links are associated with a Hypertext Transfer Protocol ("HTTP") address identifying the location of the linked web page. By selecting a particular link, such link may be followed to its corresponding linked web page.

When a link is followed, the new web page is requested from the server identified by the HTTP address associated with the link. When the new web page is requested, one of many HTTP result codes may be returned to the client. The HTTP result codes comprise a three-digit sequence and are generally divided into several categories including informational codes (i.e. 1xx), successful codes (i.e. 2xx), redirection codes (i.e. 3xx), client error codes (i.e. 4xx), and server error codes (i.e. 5xx). For example, an HTTP result code of "200" indicates that the request has succeeded, whereas, an HTTP result code of "404" indicates that the server has not found the requested web page.

Often, a web page may include numerous links to other web pages. For example, a web based telephone directory service may provide telephone listings of businesses that have purchased advertisements in the directory in response to queries submitted by visitors to the web site. The submitted queries may, for example, seek listings by the name of a business or the category of goods or services provided by a business. Each listing provided may also include a link to a web page providing information about the business having such listing.

Unfortunately, given the dynamic environment of the Internet and intranets, links included in a web page can fail for many reasons. For example, when a web page is moved to a new server location from its previous server location or is simply removed altogether, links to it can become outdated. Links that fail because they are outdated or for other reasons can be frustrating to those persons following the links, particularly when they expect to obtain needed information from the linked web page.

SUMMARY OF THE INVENTION

The system and method of the present invention are for use in assuring the quality of a web site. The system and method of the present invention are particularly directed to the quality assurance of a telephone directory web site that, in response to queries submitted by visitors to the web site, returns telephone listings including links to web pages relating to the businesses or individuals having such listings . However, it should be appreciated that the system and method of the present invention may have applicability to the quality assurance of other types of web sites as well.

The system and method of the present invention allow a user thereof to easily access and view data records generated during periodic tests of the web site. Each record corresponds with a listing in the directory and includes at least one data field having data indicative of the outcome of a search verification test and at least one data field having data indicative of the outcome of a link verification test. The data indicative of the outcome of the search verification test may comprise a string code (e.g. "OK") indicating whether the listing was properly returned by the web site when test searches by company name, category heading, phone number and the like were submitted to the web site. The data indicative of the outcome of the link verification test may comprise the HTTP result code returned when the link associated with the corresponding listing is followed. The system and method of the present invention allow the records to be filtered and sorted according to whether the link succeeded or failed during testing, as well as by the particular HTTP result code returned during testing. In this manner, the system and method of the present invention may be used to identify those links that are failing.

According to one aspect of the present invention, a system for use in assuring the quality of a web site that, in response to queries submitted by visitors to the web site, returns listings from a directory including links to web pages associated with the listings, includes a database including a plurality of records. Each record in the database corresponds to a listing in the directory and includes at least one data field having data indicative of an outcome of a search verification test and at least one data field having data indicative of an outcome of a link verification test. The system further includes a server, at least one client in communication with the server, a first interface, and a second interface. The server is enabled for searching the database for records meeting search criteria submitted to the server. The first interface is displayable by the client and is enabled for receiving search criteria and submitting search criteria received thereby to the server. The second interface is displayable by the client and is enabled for displaying a list of records meeting the submitted search criteria. In displaying the list of record, at least the data indicative of the outcome of the link verification test is displayed for each listed record. The first and second interfaces may comprise first and second web pages that are displayable by the client using a web browser.

The system of the present invention may include at least one computer executable search verification testing routine and at least one computer executable link verification testing routine. The search verification routine is enabled for generating the data indicative of the outcome of the search verification test for listings in the directory. In this regard, when executed, the search verification routine may verify whether a particular listing is being properly returned by the web site when searched for by using company name, category heading, and telephone number data from such listing to query the web site for listings matching such data. The link verification testing routine is enabled for generating the data indicative of the outcome of the link verification test for listings in the directory. In this regard, when executed, the link verification testing routine may follow a link taken from a listing store the corresponding HTTP result code returned when the link is followed in the database. The system of the present invention may further include a computer executable scheduling routine enabled for periodically initiating execution of the search verification and link verification testing routines. Such periodic execution may be initiated by the scheduling routine to occur at times when traffic on the web site is minimal, such as for example on Saturday evenings.

The system of the present invention may also include a third interface that is displayable by the client. The third interface may comprise a third web page displayable using a web browser. The third interface displays at least the data indicative of the outcome of the search verification test for a particular record displayed in the second interface. A link may be provided for each record displayed in the second interface, that, when followed, displays the third interface.

According to another aspect of the present invention, a method for use in assuring the quality of a web site that, in response to queries submitted by visitors to the web site, returns listings from a directory including links to web pages associated with the listings includes the step of generating a database including a plurality of records. Each record in the database corresponds to a listing in the directory and includes at least one data field having data indicative of an outcome of a search verification test and at least one data field having data indicative of an outcome of a link verification test. Communication is then established, for example via a data network, between at least one client and a server that is enabled for searching the database for records meeting search criteria submitted to the server. A first interface is then displayed on the client. The first interface, which may comprise a first web page, is enabled for receiving search criteria and submitting received search criteria to the server. Using the first interface, search criteria are received and submitted to the server. The database is searched for records meeting the search criteria. A second interface, which may comprise a second web page, is then displayed on the client wherein the records found in the search meeting the received search criteria are displayed. In the second interface, at least the data indicative of the outcome of the link verification test is displayed for each displayed record.

In the method of the present invention, the step of generating a database may include the steps of executing a computer executable search verification testing routine to generate the data indicative of the outcome of the search verification test for listings in the directory, and executing a computer executable link verification testing routine to generate the data indicative of the outcome of the link verification test for listings in the directory. In this regard, the method may further include the step of executing a computer executable scheduling routine that periodically initiates execution of the computer executable search verification and link verification testing routines.

The method of the present invention may also include the step of receiving an input identifying a record from the records displayed in the first interface and displaying a third interface. In the third interface, which may comprise a web page, at least data indicative of the outcome of the search verification test is displayed for the identified record.

These and other aspects and advantages of the present invention should become apparent from a review of the following detailed description when taken in conjunction with the accompanying figures.

DESCRIPTION OF THE DRAWINGS

FIG. 3 presents exemplary control data may be used in generating the parsed search verification and link verification data in the manner shown in FIG. 2;

DETAILED DESCRIPTION

The present invention provides a system and method for use in assuring the quality of a web site that returns listings from a directory in response to queries submitted by visitors to the web site. In the embodiments described below, the system and method are illustrated in connection with a telephone directory web site that returns telephone numbers and other information relating to companies listed in the directory (e.g., businesses and individuals selling goods or services in a particular metropolitan region). Each listing includes information about the company (e.g., its name, address and telephone number) and a link to a web page linked to the listing. The web page linked to a particular listing may comprise an informational page maintained by the directory provider or the company's own home page providing further information about the company. The listings are provided in response to queries input by visitors of the web site. The web site allows the directory to be queried by company name, by phone number, by the headings of various categories into which the listings are grouped (e.g. "Attorneys"), and the like. However, it should be appreciated that the method and system of the present invention may be useful in assuring the quality of other types of web sites as well.

Figure 1:
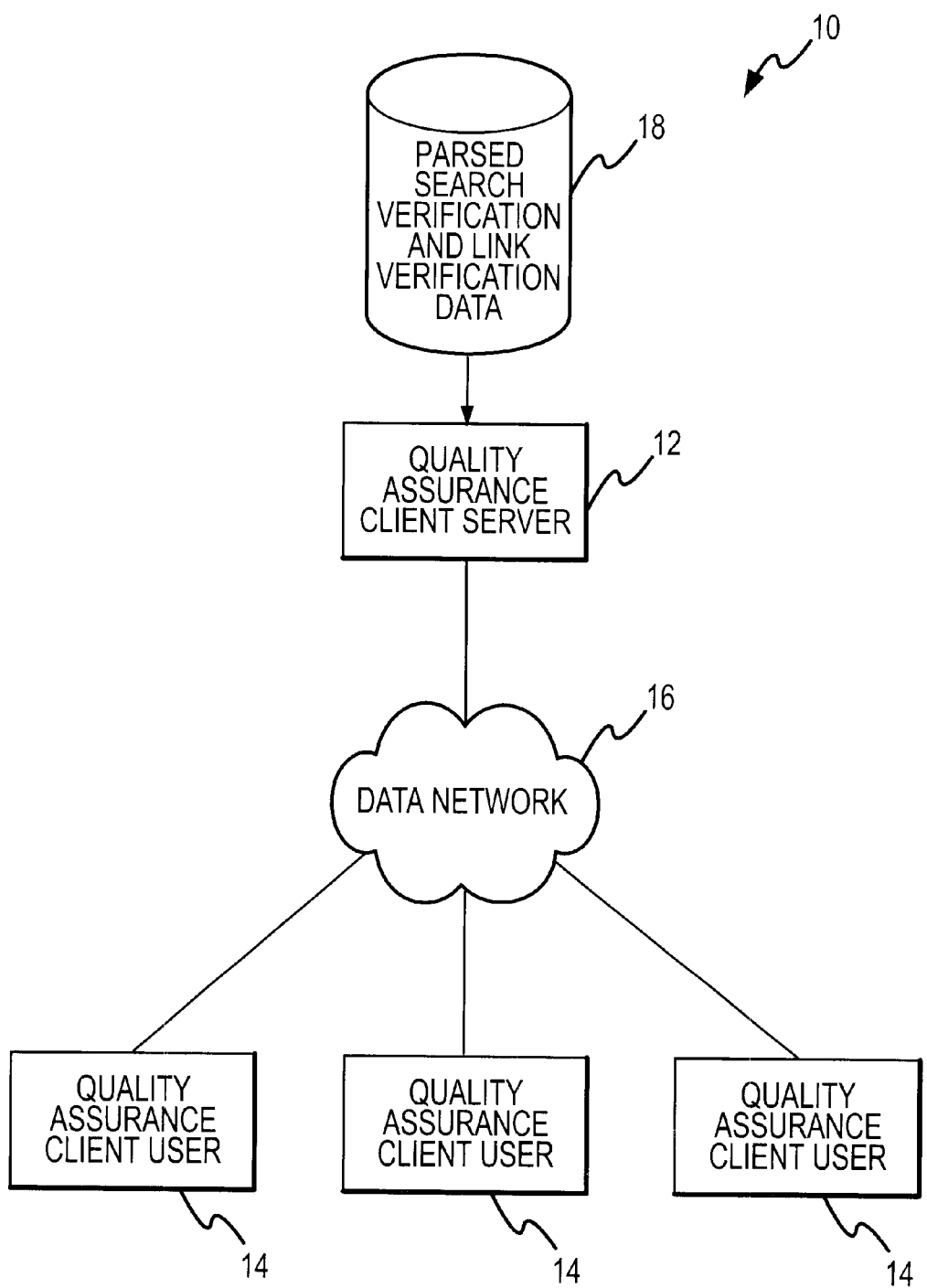
FIG. 1 presents a block diagram of one embodiment of a system for use in assuring the quality of a web site in accordance with the present invention.

Referring now to FIG. 1, a block diagram of one embodiment of a system 10 in accordance with the present invention is illustrated. The system 10 includes a quality assurance client server 12 and at least one quality assurance client user 14. As is illustrated, there may be a plurality of quality assurance client users 14. The client server 12 is accessible to the client users 14 through, for example, a data network 16, such as the Internet or an Intranet. As will be described in more detail below, the client server 14 allows the client users 16 to access and productively use search verification and link verification data 18. The search verification and link verification data 18 may be periodically generated by a one or more computer executable routines such as described below in connection with FIG. 2.

Figure 5:
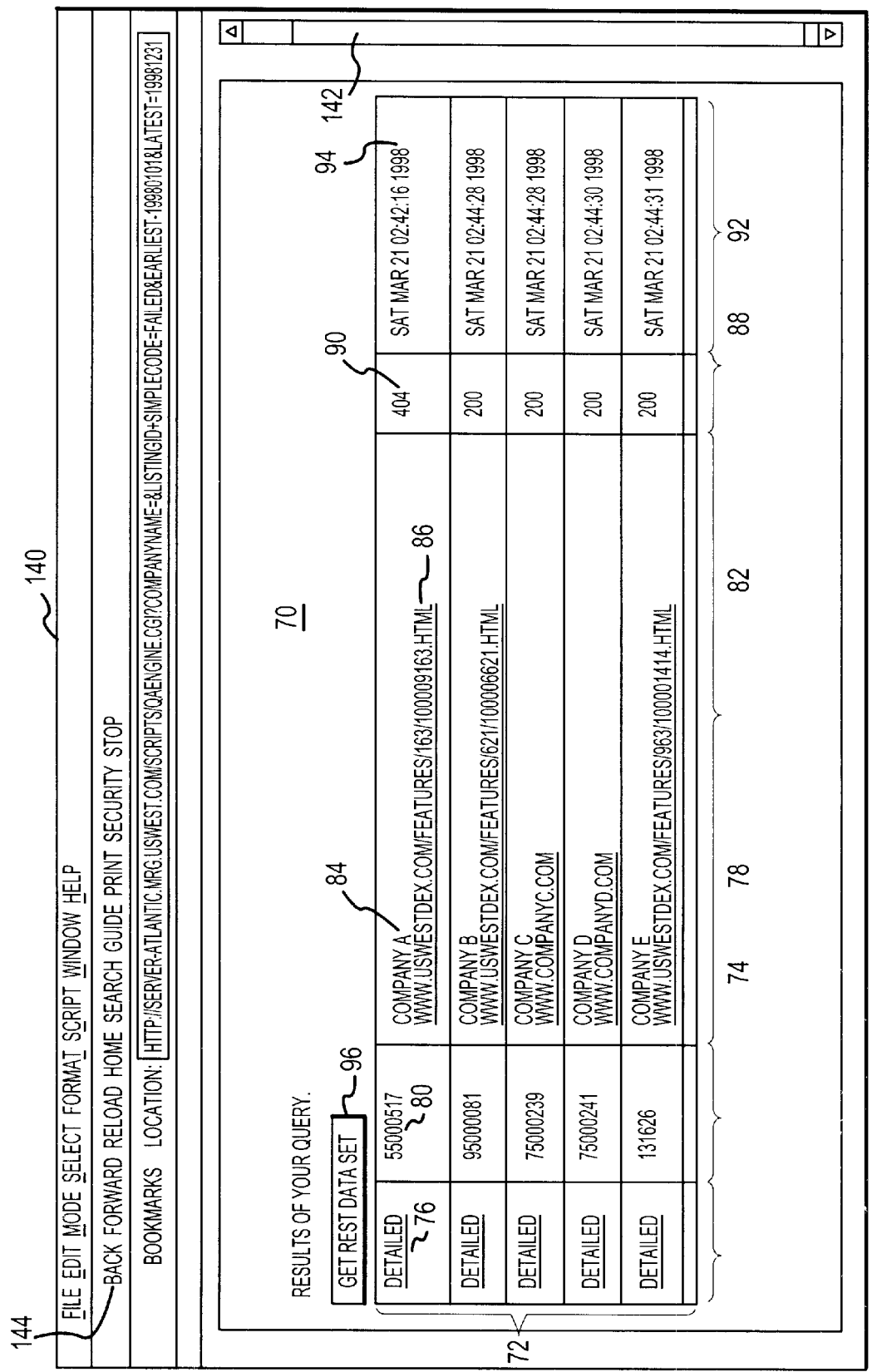
FIG. 5 presents an exemplary second web page displayable by the system of FIG. 1.
Figure 6:
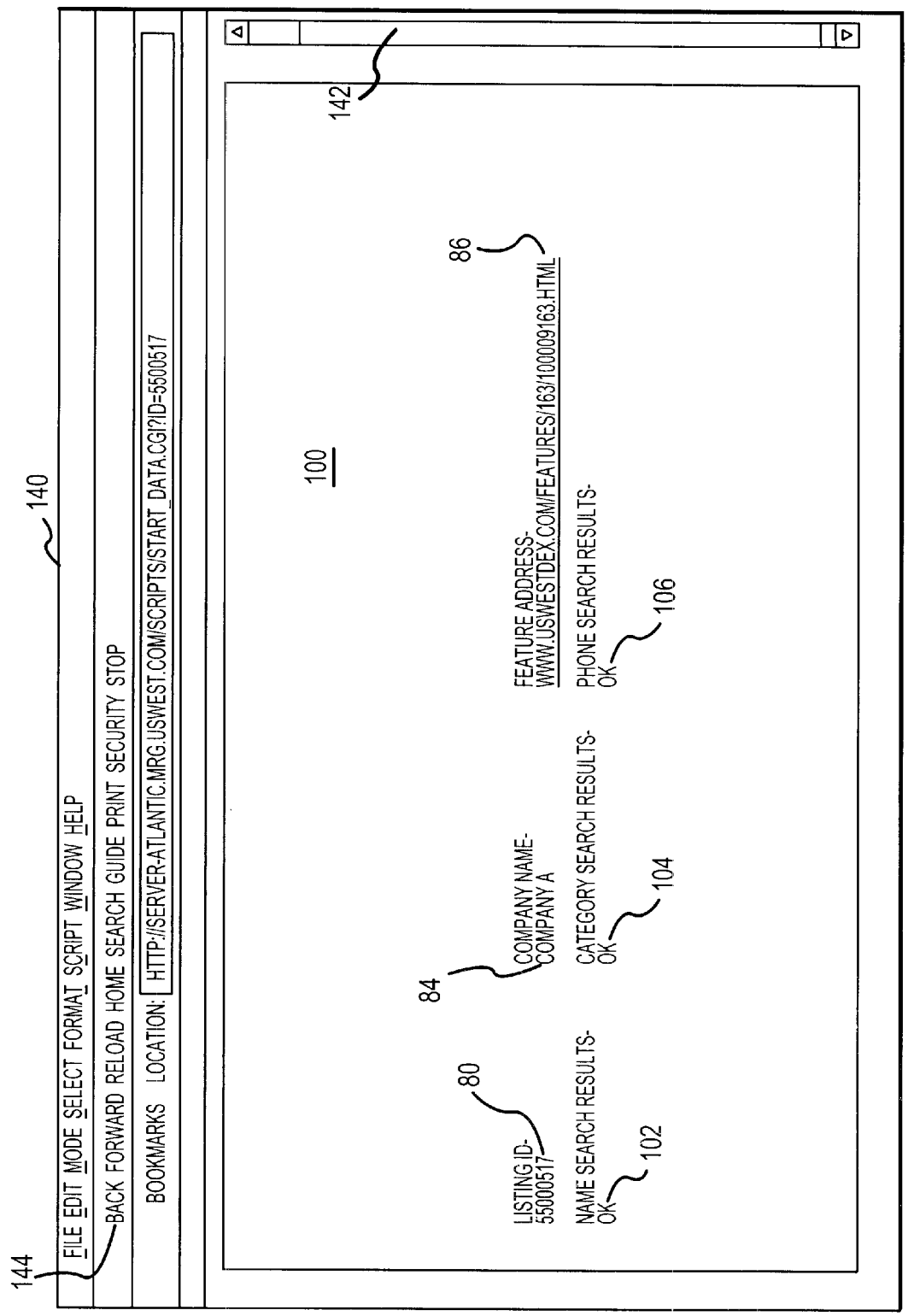
FIG. 6 presents an exemplary third web page displayable by the system of FIG. 1.

The search verification and link verification data 18 is comprised of records generated during periodic tests of the live telephone directory web site. Each record is associated with a specific listing provided by the directory and includes data within a plurality of data fields. For example, there may be data fields for the company name associated with the listing, an identification number associated with the listing ("listing ID number"), a link comprising the HTTP address for the web page associated with the company (e.g. the company's own web page or a web page about the company maintained by the telephone directory web-site provider), the HTTP result code returned when verifying the link, and the date and time that the verification test occurred. The records may also include data fields for the results of simulated queries that a visitor to the telephone directory web site might submit, such as searches by company name, category heading, and/or phone number. Exemplary records of the search verification and link verification data 18 are illustrated in FIGS. 5 and 6, described more fully below.

Figure 2:
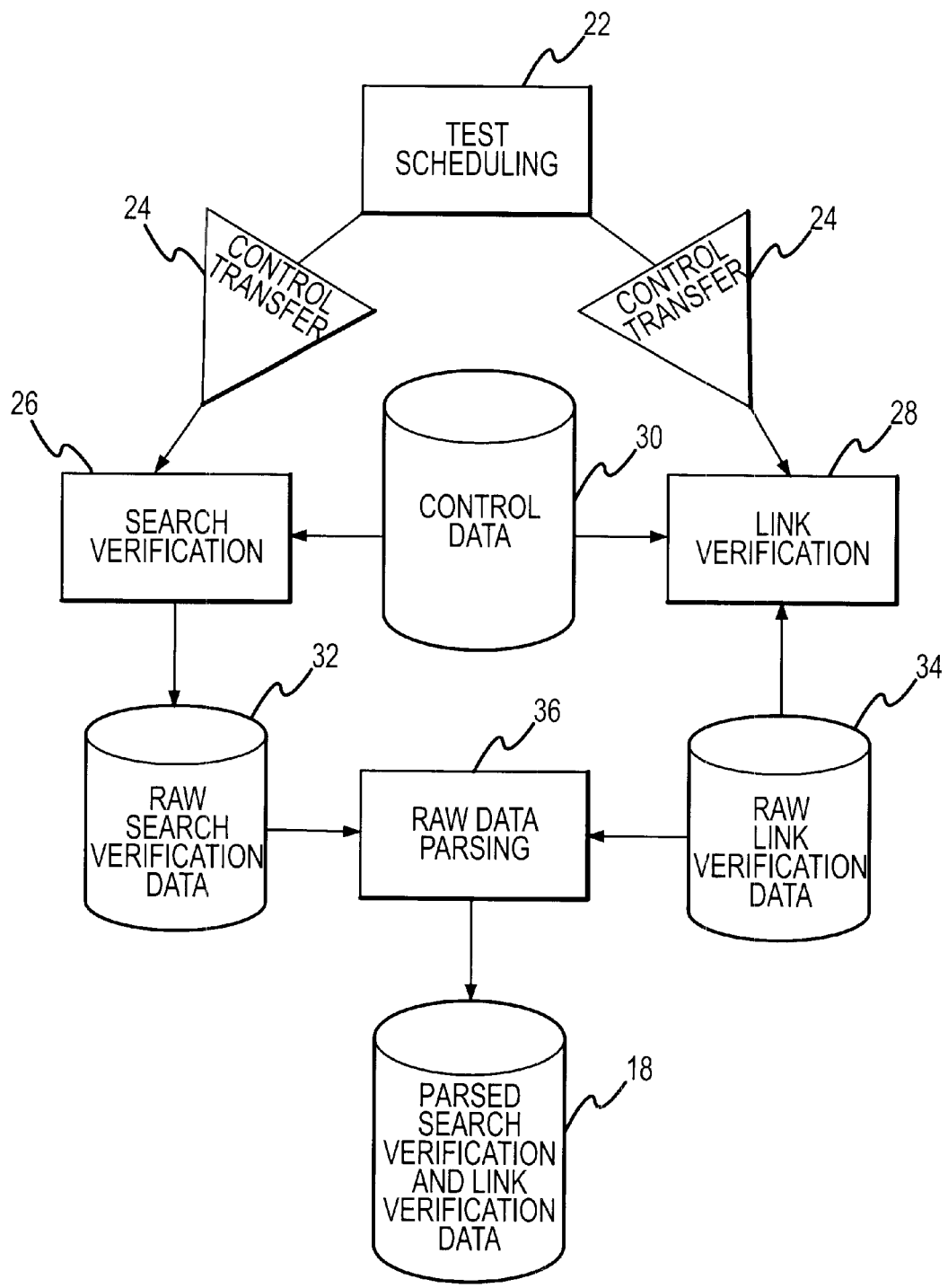
FIG. 2 presents a block diagram illustrating one manner of periodically generating parsed search verification and link verification data included in the system of FIG. 1.

Referring now to FIG. 2, there is shown a block diagram illustrating one manner in which the search verification and link verification data 18 may be periodically generated. A test scheduling routine 22 initiates periodic tests of the live telephone directory web site service. For example, the test scheduling routine 22 may be configured to initiate the tests to occur once a week at times when the number of visitors to the live web site is limited, such as on Saturday evenings. At the times when the test are to be performed, the test scheduling routine 22, as indicated by the control transfer blocks 24, initiates execution of search verification and link verification routines 26, 28. The test scheduling routine 22 may initiate execution of the search verification and link verification routines 26,28 by automatically entering the names of the routines 26,28 along with any necessary arguments at a command line prompt. As may be appreciated, execution of the search verification and link verification routines 26, 28 may also be initiated manually at the desired times in a similar manner.

Using control data 30 as an input, the search verification routine 26 verifies that listings in the directory are being properly returned when searched for by visitors to the web site and the link verification routine 28 verifies the links provided by the telephone directory web site. The search verification routine 26 outputs raw search verification data 32 and the link verification routine 28 outputs raw link verification data 34. The raw data parsing routine 36 takes the raw search verification and link verification data 32, 34 as inputs and parses the raw search verification data 32 and raw link verification data 34 to output parsed search verification and link verification data 18 which may be accessed by the client users 14 through the client server 12. As may be appreciated, the test scheduling, search verification, link verification and raw data parsing routines 22, 26, 28 and 36 may be implemented using a cross-platform scripting language such as, for example, PERL. Additionally, although the test scheduling, search verification, link verification and raw data parsing routines 22, 26, 28 and 36 are shown as separate routines in FIG. 2, it should be appreciated that some or all of the routines may be combined into one or more routines that perform the same functions.

Exemplary control data 30 is shown in a table format in FIG. 3. The control data 30 includes a plurality of listings 38. Each listing 38 in the control data 30 corresponds with a listing in the directory and includes data stored within separate data fields 40. For example, there may be data fields 40 for the company name, telephone number, category heading, the HTTP address of the web page linked for such listing, and a listing identification number. Although the control data 30 is shown in a table format in FIG. 3, the control data 30 may be stored as a tab-separated text file having one listing 38 per line. Also, as may be appreciated, the control data 30 may include many more listings than the five listings 38 illustrated and may include data in additional data fields, such as street address, city and state data fields. In this regard, the control data 30 may be comprised of the same data comprising the directory or a portion thereof.

When the search verification routine 26 is executed, it verifies that listings in the directory are being properly returned when searched for on the live telephone directory web site by utilizing data extracted from corresponding listings 38 in the control data 30 to search the live web site. The search verification routine 26 extracts the company name, telephone number, heading, and listing identification number from each listing 38 in the control data 30. In order to facilitate extraction of the company name, telephone number, heading and listing identification number from the control data 30 listings 38, the location of the company name, telephone number, heading and listing identification number data fields 40 within each line of the control data 30 text file may be predetermined. In this regard, the control data 40 text file may be formatted such that the company name, telephone number, heading and listing identification numbers are the first, second, third and last data fields 40, respectively, in each line of the control data 30 text file.

For each listing 38 in the control data 40, the search verification routine submits the extracted company name, telephone number and heading data as query terms to the live telephone directory web site. The live telephone directory web site returns the results (i.e. listings within the directory) matching the query terms extracted from the listing 38. For example, the heading "Attorneys" may be submitted to the live web site which returns listings from the directory under the heading "Attorneys". The listings from the directory that are returned by the live web site are compared with the listing 38 in the control data 40 to verify whether such listing 38 (and hence its corresponding listing in the directory) is being properly returned when searched for using the query terms extracted from the control data 30. When comparing the listing 38 from the control data 30 with the listings from the directory returned by the live web site, data within the company name, telephone number, heading, and other data fields 40, if any, such as street address, city and state, may be compared.

The search verification routine 26 generates one or more log files which comprise the raw search verification data 32. The log files include one or more string codes for each listing 38 in the control data 30 that indicate whether such listing 38 was properly returned when searched for using the extracted company name, telephone number and heading data as query terms. For example, an indication that the search successfully returned the listing 38 may be given by the code "OK". The code "failed/ph" may indicate that the listing 38 includes valid telephone data but no matching entries were returned by the live web site service. The code "failed/head" may indicate that the listing 38 contains valid heading information but no matching entries were returned by the live web-site service. The code "failed/name" may indicate that the listing 38 contains valid name information but no matching entries were returned by the live web-site service. As may be appreciated, a search for a particular listing 38 may fail because the listing 38 includes defective data. Other string codes may be used to indicate such defects. For example, the code "db?/st/cty" may indicate that the listing 38 does not include valid state or city data which could cause proximity searches of the live web site to fail. The code "db/phone?" may indicate that the listing 38 does not include valid telephone number data. Additionally, the code "error/??" may indicate that the search for the listing 38 failed for an unknown reason. As may be appreciated, many different string codes are possible.

When executed, the link verification routine 28 extracts the HTTP address and listing identification number from each listing in the control data 30 and verifies the HTTP address for each listing 38 by requesting the linked web page referenced by the HITTP address. In order to facilitate extraction of the HTTP address and listing identification number from the control data 30, the location of the HTTP address and listing identification number data fields 40 within each line of the control data 30 text file may be predetermined. In this regard, the control data 30 text file may be formatted such that the HTTP address and listing identification numbers are the second to last and last data fields 40 respectively in each line of the control data 30 text file. Depending upon what occurs when the linked web page is requested, different HTTP result codes may be returned to the link verification routine 28 by the server addressed by the link. For example, if the addressed server cannot find the requested web page, an HTTP result code of "404" may be returned, whereas an HTTP result code of "200" may be returned if the request is successful. The link verification routine 28 generates at least one log file that lists the listings 38 for which HTTP requests were completed. For each completed request, the listing identification number, HTTP address and HTTP result code may be written on one line of the log file. As may be appreciated, requests may not be completed for some of the listings 38 of the control data 30 due to various reasons including the non-existence of an HTTP address in a listing 38 or as a result of a Domain Name Server (DNS) or TCP/IP error when making the request. The link verification routine 28 may also generate other log files that list the listings 38 not having an HTTP address or for which requests could not be completed due to DNS or TCP/IP errors. The data included in the log files generated by the link verification routine 28 comprises the raw link verification data 34.

The quality assurance client server 12 permits the quality assurance client users to access the search verification and link verification data 18 and provides for filtering and sorting of the data 18 based upon search criteria entered through the client users 14. In this regard, when requested by a client user 14, the client server 12 may provide, through the data network 16, a first interface that is displayable by the client user 14. The first interface is enabled for submission of one or more search terms (i.e. search criteria) for use in searching the parsed search verification and link verification data 18. The first interface may comprise a first web page 50 that may be displayable within a web browser window 140 on the client user 14.

Figure 4:
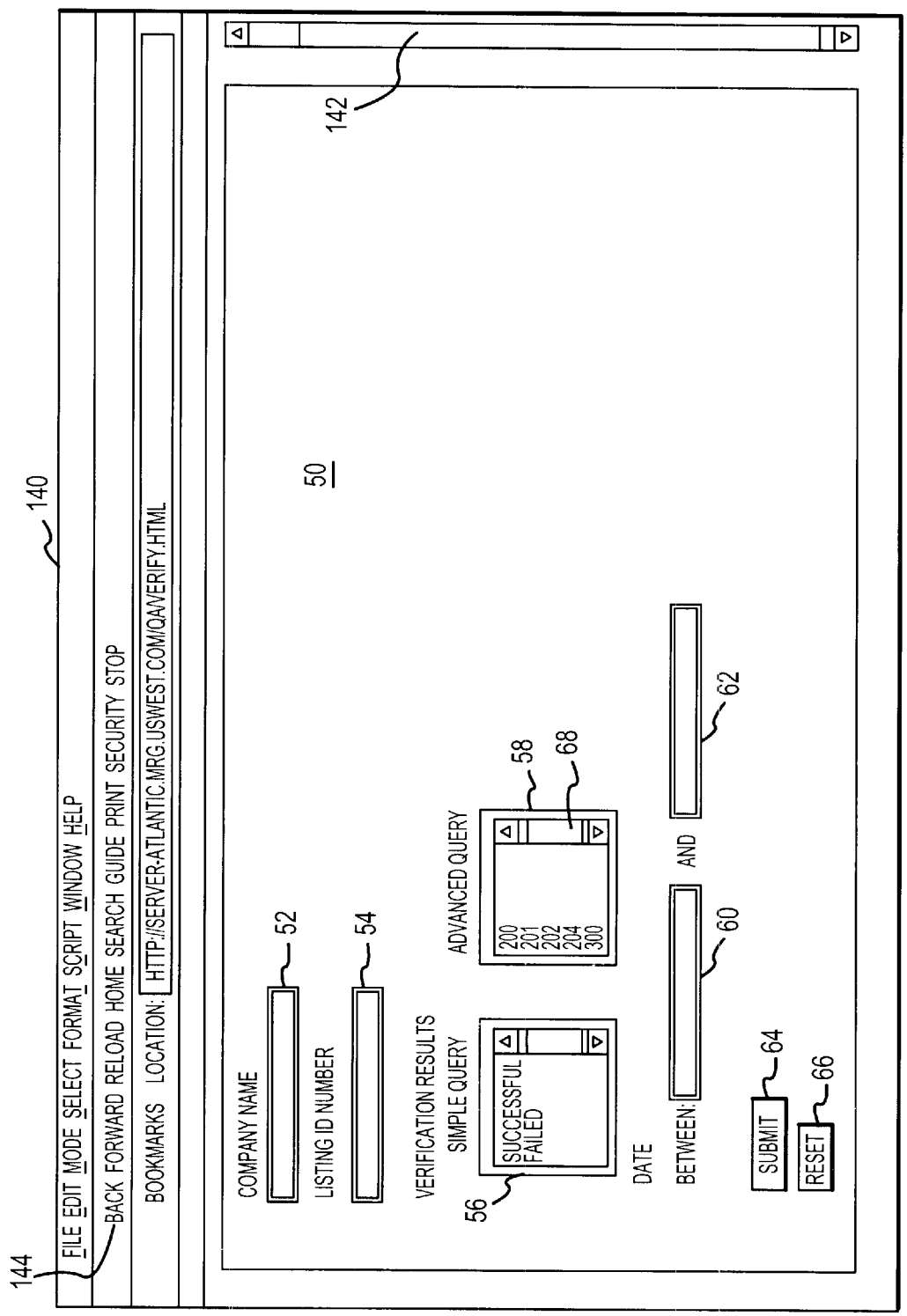
FIG. 4 presents an exemplary first web page displayable by the system of FIG. 1.

Referring now to FIG. 4, an exemplary first web page 50 is shown displayed within an exemplary web browser window 140 such as might be displayed by one of the client users 14. The first web page 50 comprises an interface wherein records of the search verification and link verification data 18 meeting specified criteria may be selected for viewing. In this regard, the first web page 50 may include one or more boxes in which a viewer of the first web page 50 may enter desired search criteria. For example, the first web page 50 may include a company name box 52, a listing identification number box 54, a simple query list box 56, an advanced query list box 58, and first and second date between boxes 60, 62. The first web page may also include a submit button 64 and a reset button 66.

To view only those records corresponding to a particular company, the name of such company may be entered in the company name box 52. To view the records corresponding to a particular listing identification number, such listing identification number may be entered in the listing identification number box 54. To view records based upon whether the links provided by the live directory service succeeded or failed during testing, the simple query list box 56 may be used to select either "successful" or "failure" from the selections included in the simple query listbox 56. To view the records in which a particular HTTP result code was returned when the link was followed during testing, such HTTP result code may be selected from the advanced query list box 58. A scroll bar 68 may be provided on the advanced query list box 58 so that the list of HTTP result codes may be scrolled in order to make additional codes visible for selection. To view records generated between certain dates, the earlier date may be entered in the first date between box 60 and the later date may be entered in the second date between box 62. The dates may be specified in a year/month/day format (e.g. Jan. 1, 1998 specified as 19980101). Criteria may be entered in a combination of the various boxes 52–62 to restrict the records returned to only those meeting the combined criteria. For example, to view all successful verifications since Jan. 1, 1998 to the present for the listing having a listing identification number of "55000517", "55000517" may be entered in the listing identification number box 54, "successful" may be selected from the simple query list box 56, "19980101" may be entered in the first date between box 60, and the remaining boxes may be left blank. Once the desired search criteria are entered, the submit button 64 may be pressed (e.g. by clicking on it with a pointing device) to submit the search criteria to the server 12. The server 12 then searches the parsed search verification and link verification data 18 for records within the parsed search verification and link verification data 18 meeting the submitted search criteria. Pressing the reset button 66 clears the entered search criteria from each of the boxes 52–62. By leaving all of the boxes 52–64 blank (i.e. submitting no criteria) all of the records within the parsed search verification and link verification data 18 may be viewed.

Referring now to FIG. 5, after a search has been submitted and completed by the server 12, the client server 12 may provide, the data network 16, a second interface that is displayable by the client user 14. The second interface lists the results of the search conducted using the submitted search criteria. As with the first interface, the second a interface may comprise a second web page 70, such as the exemplary second web page 70 shown in FIG. 4, that is displayable within the web browser window 140.

The second web page 70 lists the records 72 found within the data 18 meeting the search criteria submitted using the first web page 50. For example, FIG. 5 lists a plurality of exemplary records 72 wherein the link failed when tested and the verification test occurred on or between Jan. 1 and Dec. 31, 1998. As may be appreciated, such records 72 may be found using a search wherein "Failed" is selected from the simple query list box 56, "19980101" is entered in the first date between box 60, "19981231" is entered in the second date between box 64, and the remaining boxes 52, 54 and 58 are left blank. As is illustrated, the records 72 meeting the submitted criteria may be listed in a table having a plurality of columns. In a first column 74, a "Detailed" link 76 may be provided to a third interface wherein detailed information about the linked record 72 is displayed. In a second column 78, the listing identification numbers 80 may be displayed. A third column 82 may display the customer name 84 and a link 86 to a web page relating to the customer (e.g. a customer home page or informational web page about the customer). A fourth column 88 may list the HTTP result code 90 returned when the web page link 86 is followed during testing. A fifth column 92 may list the date and the time 94 when the verification test was conducted. For purposes of convenience in transmission and display, the records 72 meeting the search criteria may be displayed in data sets having a fixed number of records (e.g. 100 records at a time). A button 96 may be provided on the second web page 70 for getting the next set of records 72 meeting the submitted search criteria. A scroll bar 142 on the side of the web browser window 140 facilitates scrolling through the listed records included in each data set.

Referring now to FIG. 6, there is shown an exemplary third interface for providing detailed information about one of the records 72 listed in the second interface. The content of the third interface may be provided by the client server 12 to the client user 14 for display thereby via the data network 16. As with the first and second interfaces, the third interface may comprise a third web page 100 that is displayable in a web browser window 140. The third web page 100 may be displayed when the "Detailed" link 76 for one of the records 72 listed in the second web page 70 is selected. In the third web page 100, the listing identification number 80, customer name 84 and feature address link 86 may be displayed along with the string codes generated by the search verification routine for searches by customer name, category heading, and phone number 102, 104, 106, respectively. Using the "back" button 144 on the web browser window 140, causes redisplay of the second web page 70 on the client user 14.

Figure 7A:
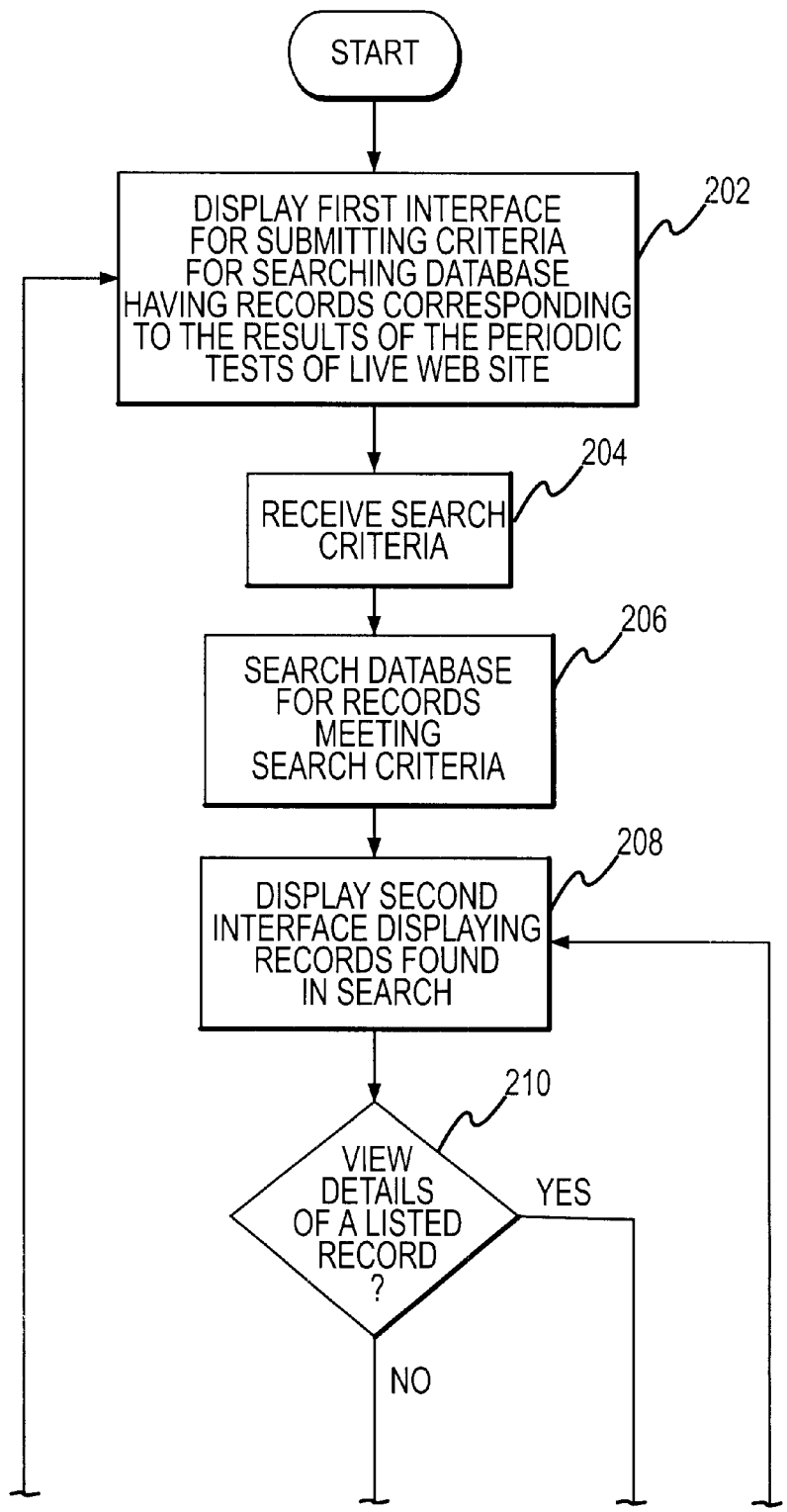
FIGS. 7A–B present the steps of one embodiment of a method for use in assuring the quality of a web site in accordance with the present invention.
Figure 7B:
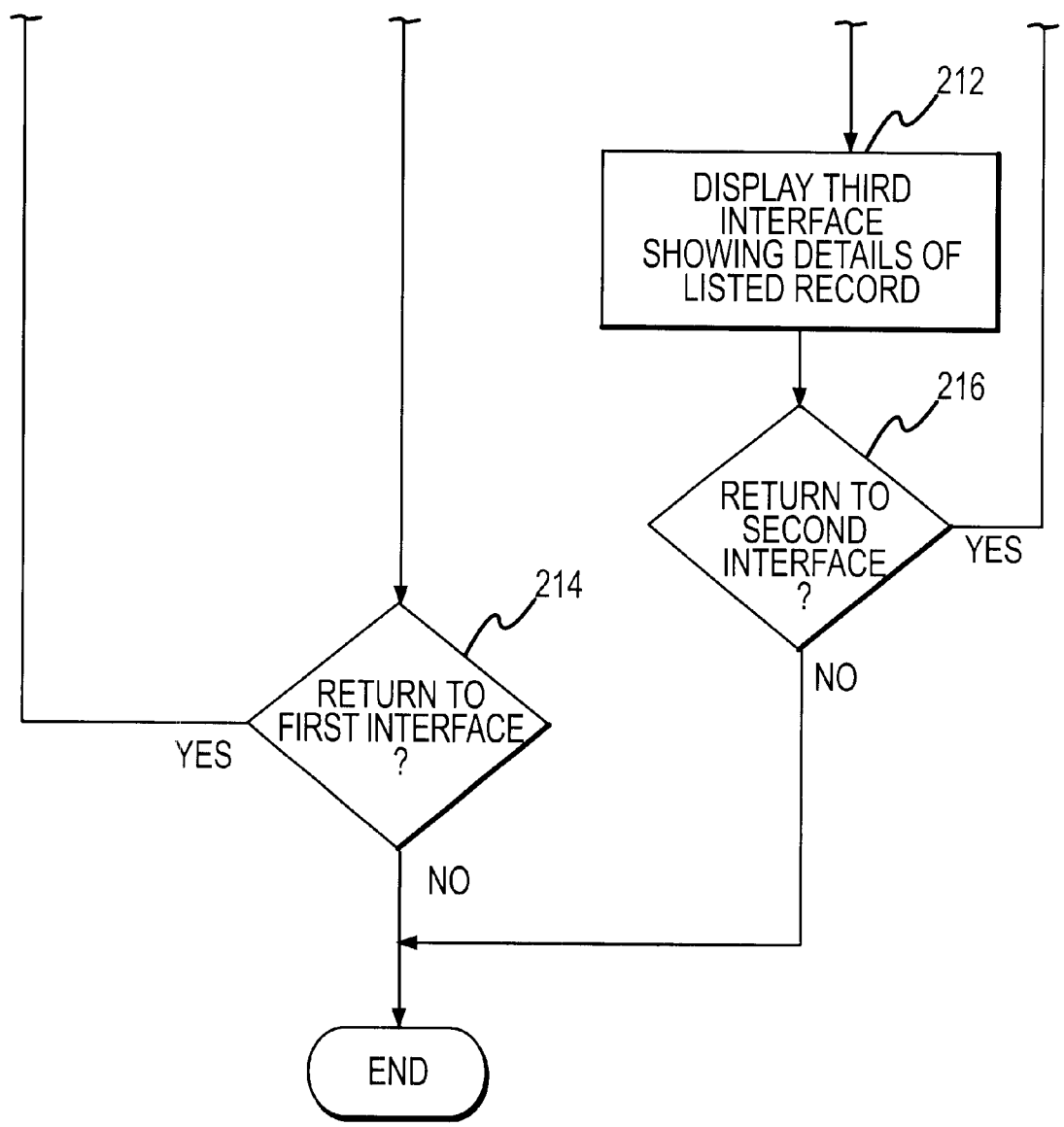

In FIGS. 7A–7B, the steps of one embodiment of a method for use in assuring the quality of a web site are illustrated. The web site may, for example, comprise a telephone directory web site that provides telephone listings and related information in response to queries by the name of companies having listings in the directory, categories into which the listings are grouped, phone numbers associated with the listings, and the like.

The method begins with step 202 wherein a first interface is displayed. The first interface allows a user to specify the results of periodic tests of the live web site service that the user wants to view by submitting criteria for use in searching a database having records corresponding to the periodic tests of the live web site. Such periodic tests may be conducted as is illustrated in FIG. 2. The first interface may comprise a first web page such as illustrated in FIG. 4, the content of which is delivered from a client server computer through a data network to a client user computer and displayed within a web browser window on the client user computer. In step 204, criteria for searching the database, which may be entered in boxes on the first web page such as described hereinbefore, are received. In step 206, the received criteria are used to search the database for records meeting such criteria. In the event that no criteria are received, the entire database may be returned.

In step 208, a second interface is displayed wherein those records found in step 206 that meet the received search criteria are displayed. The second interface may comprise a second web page, such as illustrated in FIG. 5, that is displayable within a web browser window. The records meeting the search criteria may be listed in a table format such as shown in FIG. 5. In step 208, the records may be displayed in sets, such as, for example 100 records at a time. Additional sets of records, if any, may be displayed upon receipt of a request to see such sets.

Once the records are displayed in step 208, a user viewing records in the second interface has the option of viewing detailed information for a particular record, as indicated by step 210. The user may, for example, indicate a desire to view detailed information by following a link to a web page that provides such detailed information included in each record displayed in the second interface. If the link is followed, step 212 is performed. If the user does not wish to view detailed information for any of the listed records, the user may, as indicated by step 214, return to the first interface. When the second interface comprises a second web page, this may, for example, be accomplished by pressing the "back" button on the web browser window.

In step 212, a third interface is displayed wherein detailed information for the listed record is displayed. The third interface may comprise a third web page such as is illustrated in FIG. 6. The detailed information that is displayed may include the information as described above in connection with FIG. 6. After step 212 is completed, the user may return to the second interface as indicated by step 216. Where the third interface comprises a third web page, this may be accomplished, for example, by pressing the "back" button on the web browser window.

The foregoing description of the present invention has been provided for purposes of illustration and description. This description is not intended to limit the invention and various modalities thereof. Variations, embodiments and modifications may be apparent to those skilled in the art and are intended to be within the scope of the following claims.

What is claimed is:

1. A system for use in assuring the quality of a web site that, in response to queries submitted by visitors to the web site, returns listings from a directory including links to web pages associated with the listings, said system comprising:
   a database including a plurality of records, wherein each said record corresponds to a listing in the directory and includes at least one data field having data indicative of an outcome of a search verification test and at least one data field having data indicative of an outcome of a link verification test;
   a server enabled for searching said database for records meeting search criteria submitted to said server;
   at least one client in communication with said server;
   a first interface, displayable by said at least one client, enabled for receiving search criteria and submitting search criteria received thereby to said server; and
   a second interface, displayable by said at least one client, enabled for displaying a list of said records meeting said submitted search criteria, wherein at least said data indicative of said outcome of said link verification test is displayed for each said listed record.

2. The system of claim 1 wherein said data indicative of said outcome of said link verification test comprises an HTTP result code returned when following the link associated with the listing.

3. The system of claim 2 wherein said first interface is enabled for submission of said search criteria including HTTP result codes.

4. The system of claim 1 wherein the web site returns listings from a telephone directory in response to queries by at least one of names associated with the listings in the directory, headings of categories into which the listings are grouped, and telephone numbers associated with the listings, and wherein said data indicative of said outcome of said search verification test comprises at least one string code indicating whether the listing was properly returned by the web site when a query comprising at least one of a name, category heading and telephone number from the listing is submitted to the web site.

5. The system of claim 1 wherein each said record of said database further includes a data field having data indicating a name associated with the listing, a data field having data indicating a listing identification number associated with the listing, and a data field having data indicating a date on which said search verification and link verification tests were executed, and wherein said first interface is enabled for submission of said search criteria including at least one of a name, a listing identification number, and a date.

6. The system of claim 1 wherein said first and second interfaces comprise first and second web pages, respectively, that are displayable by said at least one client using a web browser.

7. The system of claim 1 further comprising:
   a computer executable search verification routine enabled for generating said data indicative of said outcome of said search verification test for listings in the directory; and a computer executable link verification testing routine enabled for generating said data indicative of said outcome of said link verification test for listings in the directory.

8. The system of claims 7 further comprising:

a computer executable scheduling routine enabled for periodically initiating execution of said computer executable link verification testing routine and said computer executable search verification routine.

9. The system of claim 1 further comprising:

a third interface, displayable by said at least one client, enabled for displaying at least said data indicative of said outcome of said search verification test for a particular record listed in said second interface.

10. The system of claim 9 wherein said third interface comprises a third web page that is displayable by said at least one client using a web browser.

11. A method for use in assuring the quality of a web site that, in response to queries submitted by visitors to the web site, returns listings from a directory including links to web pages associated with the listings, said method comprising the steps of:

generating a database including a plurality of records, wherein each record in the database corresponds to a listing in the directory and includes at least one data field having data indicative of an outcome of a search verification test and at least one data field having data indicative of an outcome of a link verification test;

establishing communication between at least one client and a server, wherein the server is enabled for searching the database for records meeting search criteria submitted to the server;

displaying a first interface on the client enabled for receiving search criteria and submitting received search criteria to the server;

receiving search criteria with the first interface;

submitting the received search criteria to the server;

searching the database for records meeting the search criteria; and displaying a second interface on the client wherein the records found in said searching step meeting the received search criteria are displayed, wherein at least the data indicative of the outcome of the link verification test is displayed for each listed record.

12. The method of claim 11 wherein said step of generating comprises the steps of:

executing a computer executable search verification testing routine to generate the data indicative of the outcome of the search verification test for listings in the directory; and executing a computer executable link verification testing routine to generate the data indicative of the outcome of the link verification test for listings in the directory.

13. The method of claim 12 wherein said step of generating further comprises the step of:

executing a computer executable scheduling routine, wherein the computer executable scheduling routine periodically initiates execution of the computer executable search verification testing routine and the computer executable link verification testing routine.

14. The method of claim 12 wherein in said step of executing a computer executable link verification testing routine, the computer executable link verification testing routine stores, in the database, the corresponding HTTP result code returned when each link is followed in the database.

15. The method of claim 12 wherein the web site returns listings from a telephone directory in response to queries by at least one of names associated with the listings in the directory, headings of categories into which the listings are grouped, and telephone numbers associated with the listings, and wherein in said step of executing a computer executable search verification testing routine, the computer executable search verification testing routine stores, in the database, at least one string code indicating whether a listing is properly returned by the web site when a query comprising at least one of a name, category heading and telephone number from the listing is submitted to the web site.

16. The method of claim 11 wherein in said step of generating, each record of the database further includes a data field having data indicating a name associated with the listing, a data field having data indicating a listing identification number associated with the listing, and a data field having data indicating a date on which the search verification and link verification tests were executed, and wherein in said step of displaying a first interface, the first interface is enabled for receiving search criteria including at least one of a name, a listing identification number, and a date.

17. The method of claim 11 wherein in said steps of displaying a first interface and displaying a second interface, the first and second interfaces comprise first and second web pages, respectively, and wherein said steps of displaying a first interface and displaying a second interface are accomplished using a web browser operating on the client.

18. The method of claim 11 further comprising the steps of:

receiving an input identifying a record from the records listed in the first interface; and displaying a third interface wherein at least data indicative of the outcome of the search verification test is displayed for the identified record.

19. The method of claim 18 wherein in said step of displaying a third interface, the third interface comprises a third web page, and wherein said step of displaying a third interface is accomplished using a web browser operating on the client.

* * * * *